(12) United States Patent
Lindholm et al.

(10) Patent No.: US 9,026,082 B2
(45) Date of Patent: May 5, 2015

(54) TERMINAL IDENTIFIERS IN A COMMUNICATIONS NETWORK

(75) Inventors: Fredrik Lindholm, Stockholm (SE); Magnus Hallenstål, Täby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 48 days.

(21) Appl. No.: 13/382,586

(22) PCT Filed: Jul. 24, 2009

(86) PCT No.: PCT/EP2009/059617
§ 371 (c)(1),
(2), (4) Date: Jan. 27, 2012

(87) PCT Pub. No.: WO2011/009496
PCT Pub. Date: Jan. 27, 2011

(65) Prior Publication Data
US 2012/0196570 A1    Aug. 2, 2012

(51) Int. Cl.
*H04M 1/66*    (2006.01)
*H04W 8/26*    (2009.01)
*H04W 12/06*    (2009.01)
*H04W 8/18*    (2009.01)

(52) U.S. Cl.
CPC ............... *H04W 8/26* (2013.01); *H04W 8/183* (2013.01); *H04W 12/06* (2013.01)

(58) Field of Classification Search
USPC ................... 455/410, 411, 435.1, 558, 433
See application file for complete search history.

(56) References Cited

U.S. PATENT DOCUMENTS

| | | | |
|---|---|---|---|
| 5,375,251 A | 12/1994 | Pfundstein | |
| 5,765,105 A | 6/1998 | Kuriki | |
| 2007/0032232 A1* | 2/2007 | Bleckert et al. | 455/433 |
| 2007/0178885 A1* | 8/2007 | Lev | 455/411 |
| 2007/0275718 A1* | 11/2007 | Descombes et al. | 455/435.1 |
| 2008/0096555 A1* | 4/2008 | Herrmann | 455/435.1 |
| 2008/0268842 A1 | 10/2008 | Herrero-Veron | |
| 2011/0086612 A1* | 4/2011 | Montz et al. | 455/410 |

OTHER PUBLICATIONS

Evolving Systems: "Evolving Systems' Solution for Dynamic SIM Allocation." White Paper, Mar. 7, 2007, pp. 1-11.

* cited by examiner

Primary Examiner — Kwasi Karikari
(74) Attorney, Agent, or Firm — Coats & Bennett, PLLC (57) ABSTRACT

A method and apparatus for allocating an identifier to a terminal in a communications network. A core network controlling node, such as a Mobility Management Entity (MME) receives an International Mobile Subscriber Identity (IMSI) and an International Mobile Equipment Identity (IMEI) from the terminal. Subscription information is determined using both the IMSI and the IMEI. A temporary identifier that can be used to identify the terminal is then allocated to the subscription information.

8 Claims, 6 Drawing Sheets

TERMINAL IDENTIFIERS IN A COMMUNICATIONS NETWORK

TECHNICAL FIELD

The invention relates to the field of providing terminal identifiers in a communications network.

BACKGROUND

Communications devices, such as mobile telephones or personal computers, allow a subscriber to attach to a communication network and communicate with other devices. Furthermore, a growth area is that of machine to machine (M2M) communication, in which communications are sent between different devices without human intervention. Examples of the use of M2M communication include the provision of sensor networks (for example, networks for monitoring weather conditions,), surveillance equipment (for example alarm systems, video monitoring, and so on), vehicle fleet management, vending machines, monitoring manufacturing and so on.

It is predicted that in the long term future, there will be billions of M2M devices, and the number of M2M devices will far exceed the number of devices used for communication between humans (such as mobile telephones, personal computers and so on).

When a device wishes to attach to an existing 3GPP mobile access network, it must register with the network and be authenticated. Registration and authentication are handled using information contained in a Subscriber Identity Module (SIM) or Universal Subscriber Identity Module (USIM) at the device. Each device is uniquely identified by an International Mobile Subscriber Identity (IMSI) that is stored at the SIM/USIM. The IMSI is a number range managed by ITU-T, where the number is split into three sections as follows:

1. Mobile Country Code (MCC) that uniquely identifies the country (three digits).
2. Mobile Network Code (MNC) that identifies the home Public Land Mobile Network (PLMN) of the mobile subscriber (two or three digits).
3. Mobile Subscriber Identification Number (MSIN) that identifies the mobile subscriber within a PLMN (nine to ten digits).

By way of example, if the MCC is 429, the MNC is 01, and the MSIN is 1234567890, then the IMSI is 429011234567890.

If the predictions for the growth in communication devices such as M2M devices are accurate, then some countries will face a shortage of IMSI numbers. An obvious solution to a potential shortage of IMSI numbers is to extend the length of the IMSI, for example by making the MSIN twelve digits long. However, this is not a practical solution as it would require changes to terminals, access network procedures and all network nodes.

If the prediction of billions of devices holds, some countries will start to have a shortage of IMSI numbers. An obvious solution to this would simply be to extend the IMSI length. However, this would make it difficult in existing systems as it would require changes to existing mobile terminals and all other network nodes, as well as changes to access network procedures.

SUMMARY

The inventors have recognized the problems with the limited number of IMSI numbers, and the problems inherent in addressing the limited number of IMSI numbers by increasing the length of an IMSI number. It is an object of the invention to support more devices in a network without making changes to existing IMSI numbers.

According to a first aspect of the invention, there is provided a method of allocating an identifier to a terminal in a communications network. A core network controlling node, such as a Mobility Management Entity (MME) receives an International Mobile Subscriber Identity (IMSI) and an International Mobile Equipment Identity (IMEI) from the terminal. Subscription information is determined using both the IMSI and the IMEI. A temporary identifier that can be used to identify the terminal is then allocated to the subscription information. By determining subscription information using both the IMSI and the IMEI, instead of just the IMSI, many terminals can be associated with a single IMSI.

The identifier is optionally selected from any of a Temporary IMSI, a Packet Temporary IMSI, and Globally Unique Temporary Identity.

In an optional embodiment of the invention, a Home Subscriber Server (HSS) receiving the IMSI and IMEI from a core network controlling node. The IMSI identifies a user subscription. A sequence number counter is then associated with the combination of the IMSI and the IMEI. In this way, an IMSI is still unique to a particular user, but each combination of IMSI and IMEI identifies a different terminal, and so it is necessary to associate a sequence number counter with each IMSI/IMEI combination.

As an option, the method further comprises sending to the core network control node an authentication challenge as part of a process to generate session keys for the terminal, the authentication challenge comprising at least in part an identifier for the terminal. This ensures that no two terminals will be allocated the same session keys.

In an optional embodiment, the HSS receives from a core network control node the IMSI and an IMEI, and identifies a user subscription using the combination of the IMSI and the IMEI. In this way, an IMSI is not necessarily unique to a particular user, and more than one user may have the same IMSI.

According to a second aspect of the invention, there is provided a core network controlling node for use in a communications network. The core network controlling node comprises a first receiver for receiving from a terminal device a request to attach to the network. A first transmitter is provided for sending to a HSS a request for information to authenticate the terminal. A second receiver is provided for receiving, from the HSS, information relating to a subscription. A processor is arranged to allocate, on the basis of both an IMSI and an IMEI relating to the terminal, a temporary identifier to the subscription information. The temporary identifier is used to identify the terminal. A second transmitter is provided for sending the temporary identifier to the user terminal.

As an option, the core network controlling node is selected from one of a Mobility Management Entity, a Serving GPRS Support Node and a Mobile Switching Centre.

According to a third aspect of the invention, there is provided a HSS for use in a communications network. The HSS is provided with a first receiver for receiving from a core network controlling node a request for information to authenticate a terminal. The receiver is also arranged to receive an IMSI and an IMEI relating to the terminal. A processor is also provided to determine subscription information associated with the combination of the IMSI and the IMEI.

As an option, the HSS further comprises a transmitter for sending to the core network control node an authentication challenge as part of a process to generate session keys for the terminal. The authentication challenge comprises at least in part an identifier for the terminal.

As an option, the processor is arranged to identify a user subscription on the basis of the IMSI, and the subscription information identifies a unique counter relating to the user subscription. In this case, the HSS further comprises a transmitter for sending authentication information relating to the user subscription to the core network controlling node. Alternatively, the subscription information comprises a user subscription, and the HSS further comprising a transmitter for sending authentication information relating to the user subscription to the core network controlling node.

According to a fourth aspect of the invention, there is provided a computer program, comprising computer readable code which, when run on a programmable network node, causes the programmable network to perform a method as described above in the first aspect of the invention.

According to a fifth aspect of the invention, there is provided a recording medium storing computer readable code as described above in the fourth aspect of the invention.

BRIEF DESCRIPTION OF THE DRAWINGS

Some preferred embodiments of the invention will now be described by way of example only and with reference to the accompanying drawings, in which.

DETAILED DESCRIPTION

In order to increase the number of devices that can attach to a network, the International Mobile Equipment Identity (IMEI) is used in addition to the IMSI in order to create a unique identifier for each terminal. The IMEI is a number that is unique to each 3GPP mobile device. It is normally used to identify a mobile terminal to determine whether it is on a blacklist of stolen terminals. If so, then the stolen mobile terminal can be prevented from accessing the communication network, regardless of whether the SIM associated with the mobile terminal has been changed. Note that the IMEI is only used to identify the terminal and has no relation to the IMSI, although a combination of the IMEI (by checking it against the blacklist) and the IMSI is commonly used to determine whether a subscriber can connect to a particular communication network using a particular mobile terminal.

Figure 1:
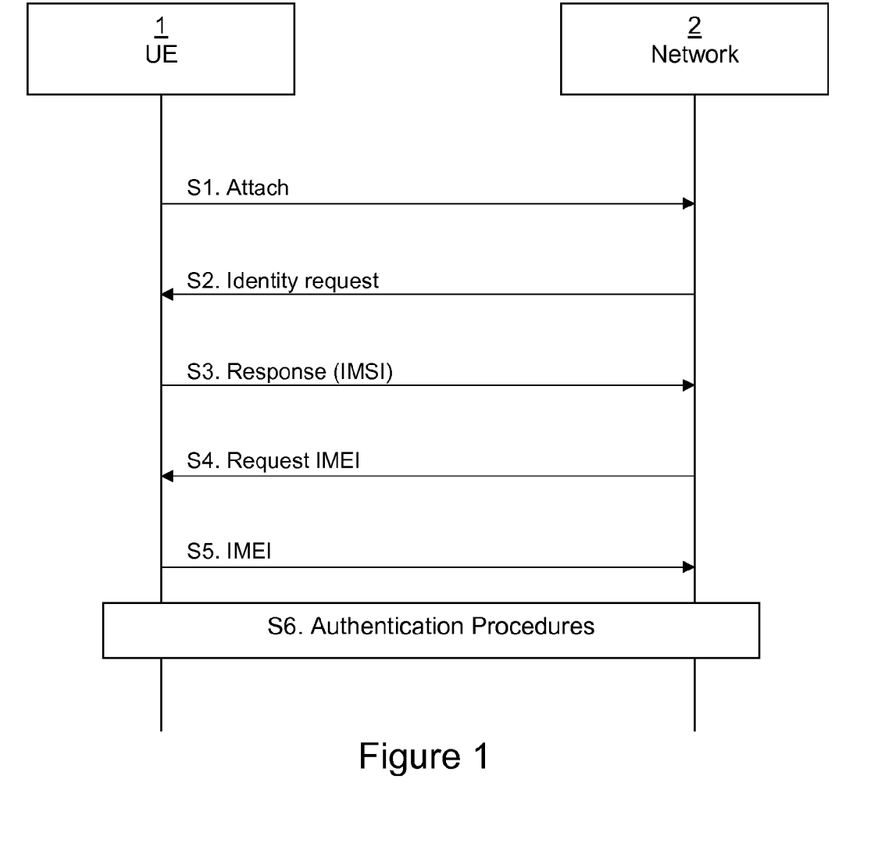
FIG. 1 is a signalling diagram showing signalling required when a User Equipment attached to a network according to an embodiment of the invention.

Referring now to FIG. 1 herein, when a terminal such as a UE 1 attaches to a network 2, it sends an attach message S1. The network 2 responds by sending an identity request S2. In response to the identity request, the UE 1 sends a response S3 that includes at least the IMSI stored at the SIM or USIM of the UE 1. If the response S3 does not also include the IMEI associated with the UE 1, then the network 2 sends a further message S4 to the UE requesting the IMEI. The UE 1 responds by sending a message S5 that includes its IMEI. Once the network 2 knows the IMSI and the IMEI, then authentication procedures S6 as described below can be performed.

In order to identify a subscription information relevant to the terminal, the network elements do not use only the IMSI as in the prior art, but a combination of the IMSI and the IMEI. In order to identify subscription information using a combination of the IMSI and the IMEI, changes must be made to most network nodes, such as the Serving GW, Mobility Management Entity (MME), Serving GPRS Support Node (SGSN), Mobile Switching Centre (MSC) and Home Subscriber Server (HSS). The Radio access networks (GERAN, UTRAN, E-UTRAN) will not be affected by the use of a combination of the IMSI and IMEI.

A Temporary IMSI (TMSI) and a Packet Temporary IMSI (P-TMSI) are allocated to the user's terminal (determined using the IMSI and IMEI described above) and used to ensure a unique identification of the terminal within a Location Area and Routing Area respectively. Alternatively, a Globally Unique Temporary Identity (GUTI) may be allocated when an Evolved Packet System (EPS) is used. This is particularly important if two terminals having the same IMSI happen to be within the same Location Area and/or Routing Area. This might occur where, for example, a subscriber has a both a personal computer and a mobile terminal connected to the network. The TMSI, P-TMSI, or GUTI are used between the UE 1 and the network 2 in all communications. In the below examples, TMSI and P-TMSI are used as examples, but a GUTI could be used instead.

By associating a subscription information identifying the terminal with a combination of the IMSI and IMEI, the number of subscriptions for UEs that can be uniquely identified in a network far exceeds that number of subscriptions for UEs that can be uniquely identified using the IMSI alone. This is because many UEs can have the same IMSI, as different terminals are identified using a combination of both the IMSI and the IMEI.

The term "user subscription" is used to refer to a subscription relating to a user, whereas the term "terminal subscription" is used herein to denote a portion of a user subscription that is relevant to a particular UE. Thus, if a user has one UE, then the terminal subscription may be the same as the user subscription. If a user has two registered UEs, then the terminal subscription for the first UE may be subscription information from the user subscription that includes information specific to that terminal.

Using a combination of an IMSI and an IMEI to identify subscription information can lead to some issues with authentication. Currently it is not possible to use the same IMSI on several terminals. This is because the authentication credentials are coupled to the IMSI. The authentication credentials include, among other things, a sequence number counter used to mitigate replay attacks. This counter must be synchronized between the UE and a Home Subscriber Server (HSS) at all times. Where multiple UEs have the same IMSI, the counter will lose synchronization between the different UEs as soon as one of them starts to authenticate itself with the network. This needs to be addressed when using the present invention, as the present invention allows multiple UEs to share the same IMSI.

There are several ways in which the issue of authentication can be addressed where a subscription is identified using a combination of an IMSI and an IMEI. Two suggested ways to address the problem are:

1. Re-using SIM/USIM credential among several UICCs; and
2 Unique credentials.

Figure 2:
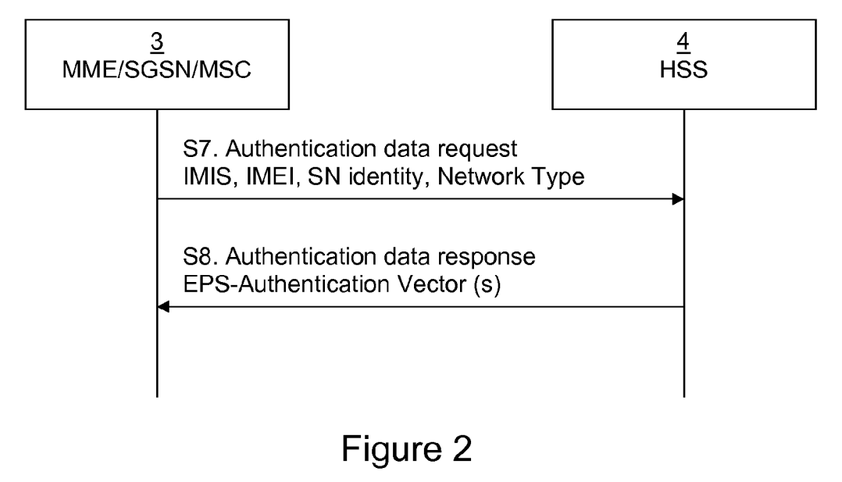
FIG. 2 is a signalling diagram showing signalling between a core network controlling node and a Home Subscriber Server according to an embodiment of the invention.

The basic principle in both these cases is illustrated in FIG. 2, and is to extend the interface between a core network controlling node such as a Mobility Management Entity (MME) 3 and the HSS 4, so that during authentication of the UE 1, the MME 3 sends S7 the UE's IMEI to the HSS 4 as well as the IMSI. The HSS 4 then returns S8 authentication data specific to the combination of the IMSI and IMEI.

Figure 3:
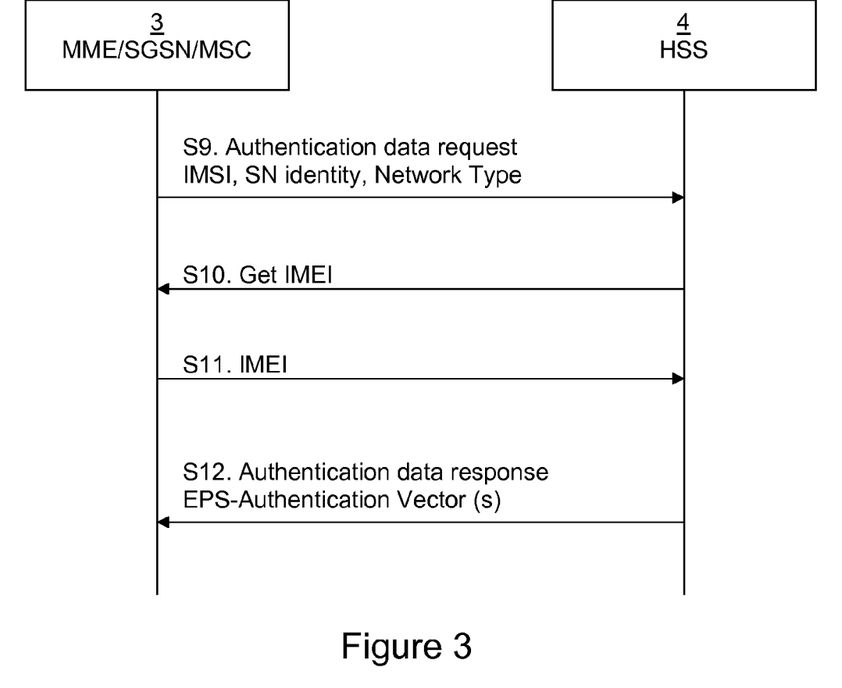
FIG. 3 is a signalling diagram showing signalling between a core network controlling node and a Home Subscriber Server according to an alternative embodiment of the invention.

FIG. 3 illustrates the case where the HSS requests the IMEI from the MME 3. In this example, the MME 3 sends S9 an authentication data request to the HSS 4. If the HSS doesn't receive the IMEI, it sends a request S10 back to the MME 3 requesting the IMEI. In response, the MME 3 sends S11 the IMEI to the HSS 4, and the HSS 4 responds S12 with an authentication data response.

Turning now to the first solution mentioned above, that of re-using SIM/USIM credential among several UICCs (a UICC is a Universal Integrated Circuit Card at which the SIM is located), an assumption is made that the IMSI is connected to a subscription owner. Thus the owner can have multiple devices, each and every one having an individual record in the HSS 4.

Figure 4:
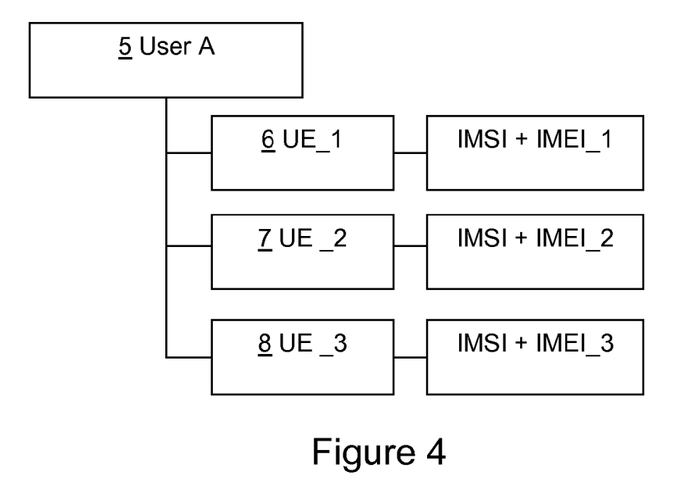
FIG. 4 illustrates schematically in a block diagram a relationship between a user, User Equipment and subscriptions relating to each User Equipment according to an embodiment of the invention.
Figure 5:
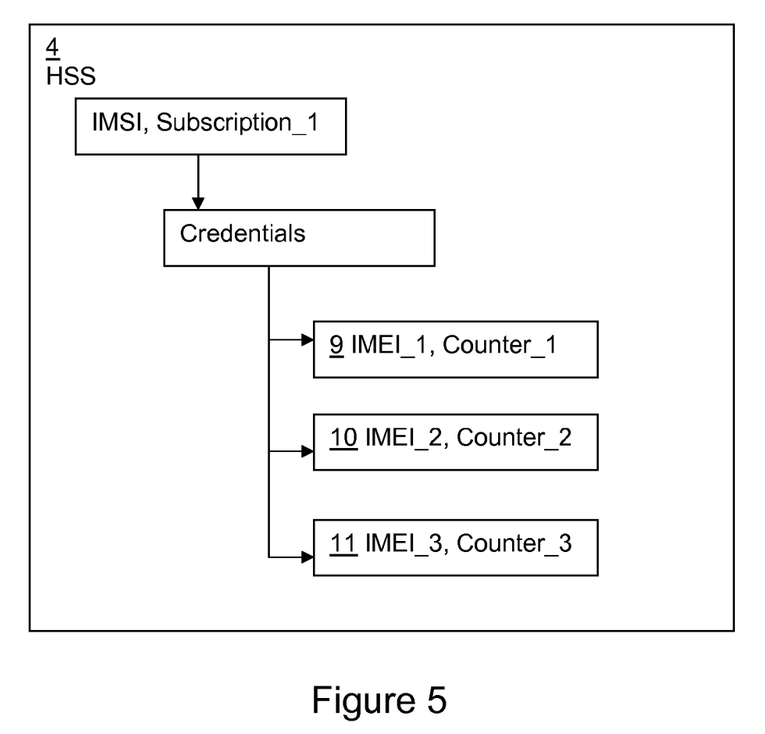
FIG. 5 illustrates schematically in a block diagram extended counter handling at a Home Subscriber Server according to an embodiment of the invention.

By way of example, and referring to FIG. 4, if User A 5 has three terminals 6, 7, 8, each terminal may all have the same IMSI provisioned in their SIM, but separate subscription information for each terminal can be identified by the combination of the IMSI and IMEIs. In this way, the credentials that are in general coupled to a specific SIM can be duplicated on several SIMs for use on different terminals. As discussed above, the main problem with sharing an IMSI between several terminals is that the sequence number that is coupled with the IMSI will get out of synchronization when more than one terminal is attached to the network. To counter this, an extended sequence counter handling is introduced at the HSS 4, as illustrated in FIG. 5.

A separate counter range 9, 10, 11 is created for each UE identified by the combination of the ISIM/IMEI, rather than creating a counter range for each IMSI. In the example of FIG. 5, the HSS 4 stores a counter range 9 for a first UE, and a second counter range 10 for a second UE, and a third counter range 11 for a third UE, even though both UEs share the same IMSI. The first time a UE 1 authenticates to the network, the HSS 4 receives the IMSI and the IMEI_2 associated with the UE 1. The HSS 4 detects that there is no entry corresponding to the IMEI_2, and thereby create a new entry 10 with a default sequence number. In this way, the problems of two terminals using the same ISIM are addressed.

In a scenario in which a user moves a *SIM (and consequently the ISIM) from one UE to another, the sequence number in the *SIM may be quite different from the one initialized in the HSS 4 when authenticating from the UE 1 the first time. This is handled by existing error handling procedures, where the UE 1 sends a synchronization failure message back to the network, indicating the sequence number that it expected to receive. The HSS 4 then updates its cache.

There is an extremely low risk of re-using the same credentials in multiple UEs sharing an ISIM. If the exact same challenge, same sequence number, and so on are sent to two different UEs, there is a risk that the same session keys (Ck/Ik) will be created and used for each UE, making communications to one UE insecure to the owner of the other UE having the same session keys. The risk of two UEs being allocated the same session keys is of the order of 1 in $2^{64}$, as a fresh challenge is always created from the network. However, one way to remove this remote risk is to create a challenge such that the first e.g., 8 bits identify the UE, and the rest of the challenge is created at random. In this way, the full challenge sent will be unique among all UEs sharing the same ISIM. Note that the number of bits required to ensure that the challenge is unique depends upon the number of UEs that share the same ISIM. The 8-bit example described above means that an ISIM could be shared among up to 256 different UEs.

Figure 6:
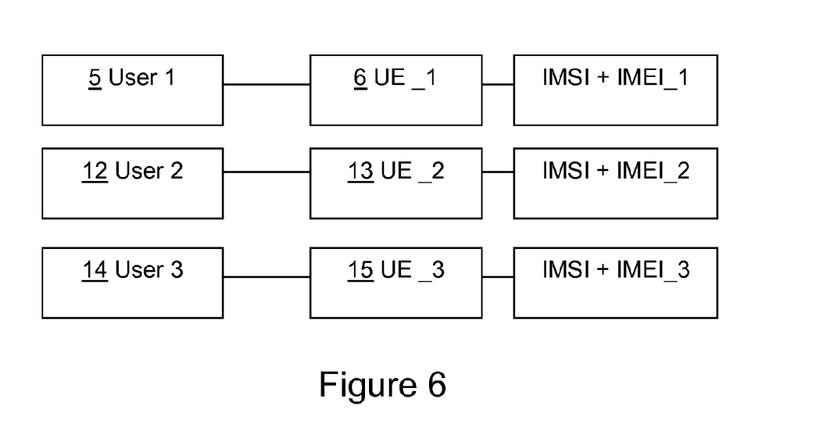
FIG. 6 illustrates schematically in a block diagram a relationship between users, User Equipment and subscriptions relating to each user and User Equipment according to an embodiment of the invention.
Figure 7:
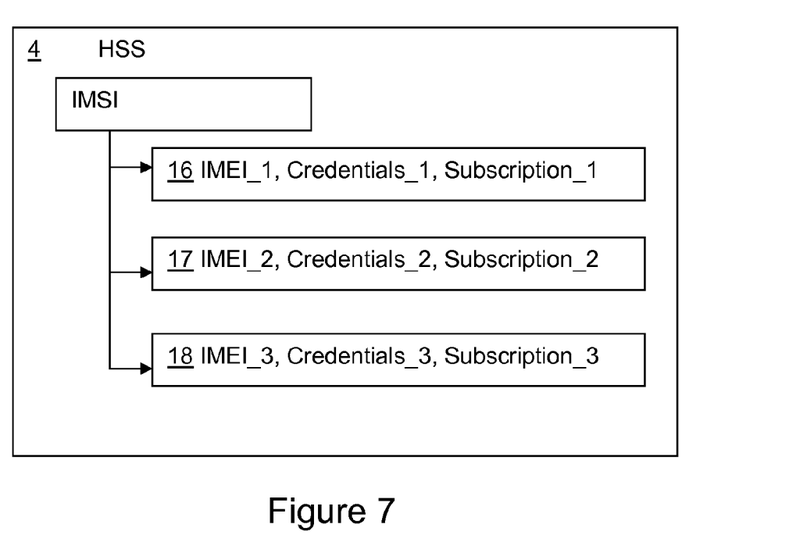
FIG. 7 illustrates schematically in a block diagram extended credential handling at a Home Subscriber Server according to an embodiment of the invention.

The second solution to the issue of authentication is using unique credentials. As illustrated in FIG. 6, each IMSI/IMEI combination identifies a unique user subscription, allowing a huge number of user subscriptions. In the example of FIG. 7, each of the users 5, 12, 14 has a UE (6, 13 and 15 respectively). Each UE 6, 13, 15 shares the same IMSI. However, as each user subscription is now identified by a combination of the IMSI and the IMEI, then each user's subscription can be identified separately despite the UEs sharing an IMSI.

The approach of using unique credentials implies that for each IMSI, there is also one or more configured IMEI that points to credentials to be used to authenticate the UE, as illustrated in FIG. 7, in which the three subscriptions 16, 17, 18 have unique IMEIs but share the same IMSI.

When the MME 3 performs an authentication data request using the IMSI and IMEI, the HSS 4 first finds the IMSI entry in the database, and then further locates the IMEI and the authentication data related to that IMEI. In this way, the UE can be authenticated (or not) in the network.

At some point, the credentials must be coupled to both the IMSI and the IMEI. Some examples of how and when to do this are as follows:

The UE is delivered and provisioned with the *SIM when being sold, and so the provisioning of the relevant data can be done before delivering the equipment in the same way as *SIMs are currently provisioned.

The user buys a device and a separate *SIM. The user is required to use a self provisioning system, for example by logging on to an activation page, in which the user enters the *SIM identity and the IMEI in order to couple the two in the operator's network and to activate the SIM.

The Downloadable USIM solution can be extended to include the IMEI as a reference to automatically provision a *SIM on the UE.

Re-using SIM/USIM credentials among several UICCs and using unique credentials can both be used within the same network, allowing flexibility for the network operator for different subscription types. The invention may be used for any type of UE, but it is seen as most appropriate for M2M networks in which UEs may not require a great deal of functionality and the ISIM is owned by a single entity. For example, a gas meter operator using an M2M network may have 256 UEs acting as meter flow monitors. Each UE has the same ISIM but a different IMEI, and so as they have different subscriptions.

Figure 8:
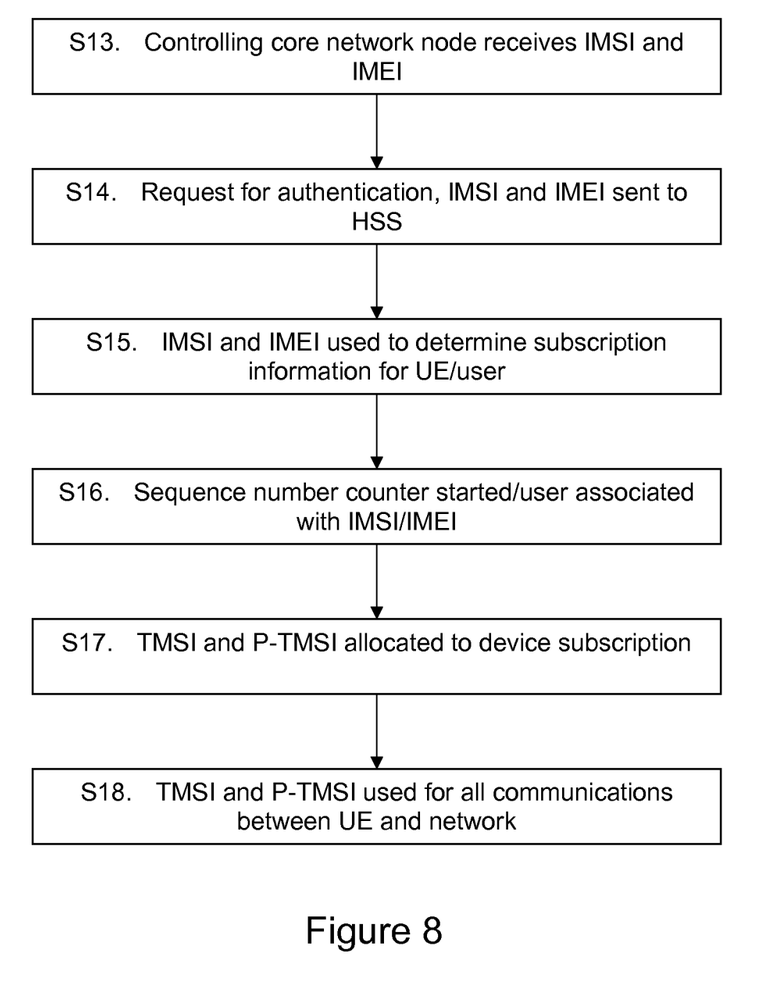
FIG. 8 is a flow diagram illustrating the steps of an embodiment of the invention.

Referring now to FIG. 8, a flow diagram is shown illustrating steps of an embodiment of the invention. The following numbering corresponds to the numbering of FIG. 8:

S13. A core network controlling node such as an MME in the network 4 receives an IMSI that is associated with a SIM at the UE 1, and an IMEI associated with the UE 1 itself, as illustrated in FIG. 1.

S14. A request for authentication is sent to the HSS 4.

S15. The HSS uses the IMSI and the IMEI to determine subscription information for the UE 1 and returns the authentication information to the MME 3.

S16. The HSS also starts a sequence number counter associated with the IMSI/IMEI combination. If a counter does not exist, a new counter is created with a default value. If a counter exists, the existing counter is used.

S17. A TMSI and a P-TMSI are allocated to the terminal subscription for the duration of the communication session.

S18. The TMSI and P-TMSI are used for all communications between the network 2 and the UE 1.

Figure 9:
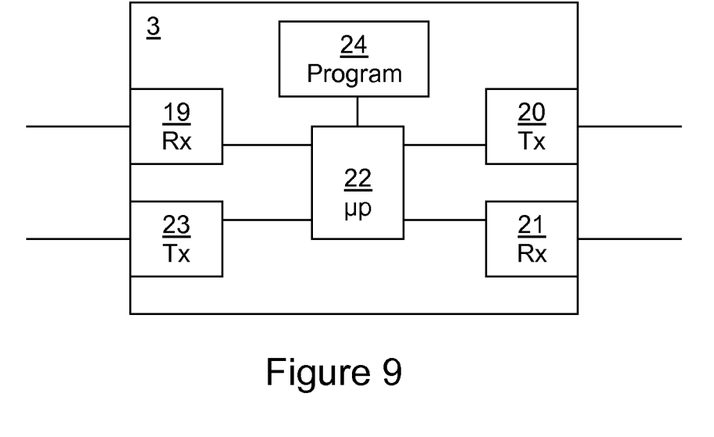
FIG. 9 illustrates schematically in a block diagram a core network controlling node according to an embodiment of the invention.

Referring to FIG. 9, there is illustrated a core network controlling node 3 such as a MME. The MME 3 is provided with a receiver 19 for receiving from a UE 1 a request to register with the network. A transmitter 20 is used to send a request to the HSS 4 to authenticate the UE 1, and a second receiver 21 receives information relating to subscription information from the HSS 4. A processor 22 allocates a TMSI and a P-TMSI (or a GUTI) on the basis of the IMSI and the IMEI received from the UE 1, and a second transmitter 23 sends TMSI and the P-TMSI to the UE 1. The MME 3 may also include software 24 to allow it to perform the functions described above.

Figure 10:
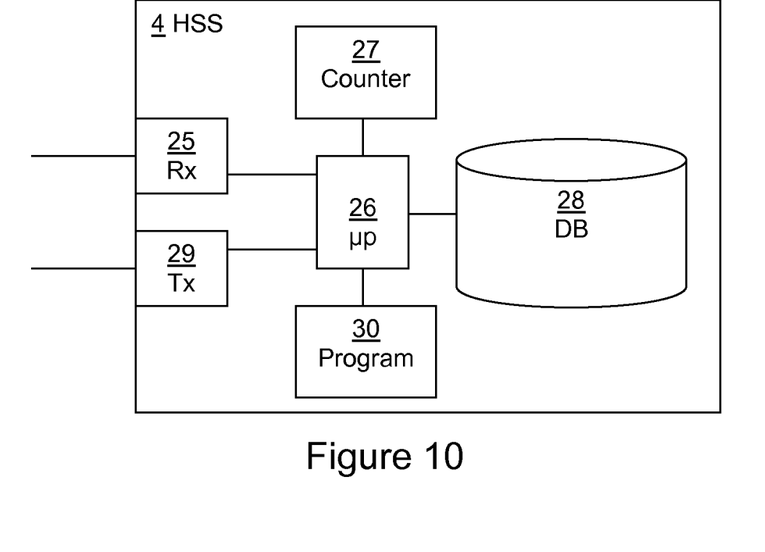
FIG. 10 illustrates schematically in a block diagram a Home Subscriber Server according to an embodiment of the invention.

Turning now to FIG. 10, there is illustrated a HSS 4. A receiver 25 is arranged to receive a request for authentication information from the MME 3. The receiver 25 is also arranged to receive the IMSI and the IMEI relating to the UE 1 from the MME 3. A processor 26 associates a sequence number counter 27 with IMSI/IMEI combination. The database 28 contains user subscription information, which is associated with an IMSI or a combination of the IMSI/IMEI as described above. A transmitter 29 is arranged to send authentication information for the user subscription to the MME 3. The HSS 4 may also include software 30 to allow it to perform the functions described above.

The invention allows a network to re-use IMSIs for more terminals without affecting the UEs and the interface between the UE and the network. This ensures that legacy UEs and certain network elements need not be modified, and a great many more UEs can be provisioned in a network.

It will be appreciated that variations from the above described embodiments may still fall within the scope of the invention. For example, whilst the MME has been used as an example of a core network controlling node, other examples include a Serving GPRS Support Node (SGSN) and a Mobile Switching Centre (MSC).

The following abbreviations have been used in this specification:
EPS Evolved Packet System
GUTI Globally Unique Temporary Identity
HSS Home Subscriber Server
IMEI International Mobile Equipment Identity
IMSI International Mobile Subscriber Identity
MCC Mobile Country Code
MME Mobility Management Entity
MNC Mobile Network Code
MSC Mobile Switching Centre
MSIN Mobile Subscriber Identification Number
PLMN Public Land Mobile Network
SGSN Serving GPRS Support Node
SIM Subscriber Identity Module
UE User Equipment
UICC Universal Integrated Circuit Card
USIM Universal Subscriber Identity Module

The invention claimed is:

1. A method of allocating an identifier to a terminal in a communications network, the method comprising:
   receiving, at a Home Subscriber Server from a core network control node, an International Mobile Subscriber Identity and an International Mobile Equipment Identity relating to the terminal;
   determining, at the Home Subscriber Server, subscription information using both the International Mobile Subscriber Identity and the International Mobile Equipment Identity; and
   associating, at the Home Subscriber Server, a sequence number counter with the combination of the International Mobile Subscriber Identity and the International Mobile Equipment Identity.

2. The method according to claim 1 further comprising sending to the core network control node an authentication challenge as part of a process to generate session keys for the terminal, the authentication challenge comprising at least in part an identifier for the terminal.

3. The method according to claim 1 further comprising:
   identifying a user subscription using the combination of the International Mobile Subscriber Identity and the International Mobile Equipment Identity.

4. A Home Subscriber Server for use in a communications network, the Home Subscriber Server comprising:
   a first receiver configured to receive from a core network controlling node: a request for information to authenticate a terminal, the receiver also configured to receive an International Mobile Subscriber Identity and an International Mobile Equipment Identity relating to the terminal; and
   a processor configured to:
      determine subscription information associated with the combination of the International Mobile Subscriber Identity and the International Mobile Equipment Identity; and
      associate a sequence number counter with the combination of the International Mobile Subscriber Identity and the International Mobile Equipment Identity.

5. The Home Subscriber Server according to claim 4 further comprising a transmitter for sending to the core network control node an authentication challenge as part of a process to generate session keys for the terminal, the authentication challenge comprising at least in part an identifier for the terminal.

6. The Home Subscriber Server according to claim 4:
   wherein the processor is further configured to identify a user subscription on the basis of the International Mobile Subscriber Identity, where the subscription information identifies a unique counter relating to the user subscription;
   wherein the Home Subscriber Server further comprises a transmitter for sending authentication information relating to the user subscription to the core network controlling node.

7. The Home Subscriber Server according to claim 4:
   wherein the subscription information comprises a user subscription;

wherein the Home Subscriber Server further comprises a transmitter for sending authentication information relating to the user subscription to the core network controlling node.

8. A computer program stored in a non-transient computer readable medium, the computer program comprising computer readable code which, when run on a programmable network node, causes the programmable network node to:
receive, from a core network control node, an International Mobile Subscriber Identity and an International Mobile Equipment Identity relating to the terminal;
determine subscription information using both the International Mobile Subscriber Identity and the International Mobile Equipment Identity;
associate a sequence number counter with the combination of the International Mobile Subscriber Identity and the International Mobile Equipment Identity.

* * * * *

UNITED STATES PATENT AND TRADEMARK OFFICE
CERTIFICATE OF CORRECTION

| | | |
|---|---|---|
| PATENT NO. | : 9,026,082 B2 | Page 1 of 1 |
| APPLICATION NO. | : 13/382586 | |
| DATED | : May 5, 2015 | |
| INVENTOR(S) | : Lindholm et al. | |

It is certified that error appears in the above-identified patent and that said Letters Patent is hereby corrected as shown below:

Specification

In Column 1, Line 19, delete "conditions,),"" and insert -- conditions,) --, therefor.

In Column 5, Line 55, delete "ISIM/IMEI," and insert -- IMSI/IMEI, --, therefor.

In Column 5, Line 65, delete "ISIM" and insert -- IMSI --, therefor.

In Column 5, Line 67, delete "ISIM)" and insert -- IMSI) --, therefor.

In Column 6, Line 8, delete "ISIM." and insert -- IMSI. --, therefor.

In Column 6, Line 20, delete "ISIM." and insert -- IMSI. --, therefor.

In Column 6, Line 22, delete "ISIM." and insert -- IMSI. --, therefor.

In Column 6, Line 23, delete "ISIM" and insert -- IMSI --, therefor.

In Column 6, Line 66, delete "ISIM" and insert -- IMSI --, therefor.

In Column 7, Line 2, delete "ISIM" and insert -- IMSI --, therefor.

Signed and Sealed this
Sixteenth Day of February, 2016

Michelle K. Lee
*Director of the United States Patent and Trademark Office*